US012283685B2

(12) United States Patent
Karahan

(10) Patent No.: US 12,283,685 B2
(45) Date of Patent: Apr. 22, 2025

(54) UTILIZATION OF ELECTRIC ARC FURNACE FLUE DUST EMERGING FROM STEEL INDUSTRY (DURING THE PRODUCTION OF FERRO ALLOYS AND STEEL FROM SCRAPS) AS ELECTRODE MATERIAL IN ENERGY APPLICATIONS

(71) Applicant: ISTANBUL MEDIPOL UNIVERSITESI, Istanbul (TR)

(72) Inventor: Billur Deniz Karahan, Istanbul (TR)

( * ) Notice: Subject to any disclaimer, the term of this patent is extended or adjusted under 35 U.S.C. 154(b) by 827 days.

(21) Appl. No.: 17/441,508

(22) PCT Filed: Mar. 10, 2020

(86) PCT No.: PCT/TR2020/050195
§ 371 (c)(1),
(2) Date: Sep. 21, 2021

(87) PCT Pub. No.: WO2020/190237
PCT Pub. Date: Sep. 24, 2020

(65) Prior Publication Data
US 2022/0181600 A1    Jun. 9, 2022

(30) Foreign Application Priority Data

Mar. 21, 2019 (TR) .............. TR2019/04203

(51) Int. Cl.
*H01M 4/04* (2006.01)
*F27B 3/08* (2006.01)
(Continued)

(52) U.S. Cl.
CPC .......... *H01M 4/0483* (2013.01); *F27B 3/085* (2013.01); *H01M 4/131* (2013.01); *H01M 4/1391* (2013.01); *H01M 10/0525* (2013.01)

(58) Field of Classification Search
CPC ...... C22B 7/02; F27B 3/085; H01M 10/0525; H01M 4/04; H01M 4/0483; H01M 4/131;
(Continued)

(56) References Cited

U.S. PATENT DOCUMENTS 7,563,182 B2 * 7/2009 Shindo ............... A63B 37/0074
473/378
8,087,450 B2 * 1/2012 Nycz ...................... B22C 1/183
164/361
(Continued)

FOREIGN PATENT DOCUMENTS

CN    106904654 A    6/2017

OTHER PUBLICATIONS

International Search Report for corresponding PCT/TR2020/050195, dated Sep. 11, 2020.
(Continued)

*Primary Examiner* — Quang T Van
(74) *Attorney, Agent, or Firm* — Egbert, McDaniel & Swartz, PLLC

(57) ABSTRACT

Disclosed is the use of electric arc furnace flue dust and materials that are recovered from the flue dust of electric arc furnaces (EAF) used in the production of ferroalloys or steel from scrap metals, as electrode materials in electrochemical applications such as energy storage.

7 Claims, 4 Drawing Sheets

(51) Int. Cl.
    *H01M 4/13*        (2010.01)
    *H01M 4/131*       (2010.01)
    *H01M 4/1391*     (2010.01)
    *H01M 10/0525*    (2010.01)

(58) Field of Classification Search
    CPC ...... H01M 4/1391; H01M 4/483; H01M 4/58; Y02E 60/10; Y02P 10/20
    USPC .................................. 373/60, 88, 89, 93, 108
    See application file for complete search history.

(56) References Cited

U.S. PATENT DOCUMENTS

| | | | |
|---|---|---|---|
| 8,110,019 B2* | 2/2012 | Fernandez Lopez ... | C22B 19/30 75/751 |
| 9,252,616 B2* | 2/2016 | Goldstein ............. | H01M 50/70 |
| 2003/0023128 A1 | 1/2003 | Smith | |
| 2015/0125366 A1 | 5/2015 | Kim et al. | |

OTHER PUBLICATIONS

Written Opinion of the International Searching Authority for corresponding PCT/TR2020/050195, dated Sep. 11, 2020.
International Preliminary Report on Patentability for corresponding PCT/TR2020/050195, dated Aug. 26, 2021.

* cited by examiner

UTILIZATION OF ELECTRIC ARC FURNACE FLUE DUST EMERGING FROM STEEL INDUSTRY (DURING THE PRODUCTION OF FERRO ALLOYS AND STEEL FROM SCRAPS) AS ELECTRODE MATERIAL IN ENERGY APPLICATIONS

TECHNICAL FIELD

The present invention relates to the use of electric arc furnace flue dust and materials that are recovered from the flue dust of electric arc furnaces (EAF) used in the production of ferroalloys or steel from scrap metals, as electrode materials in electrochemical applications such as energy storage.

PRIOR ART

Changes in political and economic balances motivate countries to carry out independent production by using their own capital under conditions that are in accordance with environmental rules. At this point, it is important for countries to generate energy by using the renewable energy sources, to store it and to carry it to serve upon the customer requests. Capacitors and batteries used in energy storage attract attention due to their outstanding performances.

Nowadays, metal oxides, which are used frequently in electrochemical applications, are generally obtained synthetically. At this point, high investment costs and energy expenditures may be required to produce metal oxide powders.

However, studies have shown that most of the wastes generated in the pyrometallurgical metal production industry contain metal oxide. Since our country was one of the top ten countries in the world in steel production in 2016 and that 70% of the steel production was made in electric arc furnaces (EAF), it has been planned to produce electrodes for electrochemical applications by using this flue dust or recovering metal oxides from this flue dusts formed in EAF.

Due to the water-soluble heavy metals such as lead, cadmium, chromium (in some cases, mercury and arsene) that EAF dust (EAFD) contains, the latter has been accepted as "threatening for the environment and human health" by EPA since 1980. In the European Waste Catalog (EWC, 2002), EAFFD is considered as a hazardous waste with the code 10-02-07. This EAFFD, being treated as the "hazardous waste" class by many countries, including our country, can generally be utilized in three ways: (i) they can be stored in industrial waste storage areas, (ii) they can be fed back into the production process, (iii) they can be recycled to be used in other processes/products.

Given the first of these alternatives, due to its health-hazardous nature of EAFFD, it must be buried in safer storage areas, for example, in areas that do not receive rainwater so that heavy metals in the dust cannot diffuse into groundwater. In recent years, due to the increased control costs of the disposal sites and logistics services, the cost of such a waste storage method has increased and because the metals in the waste dust will be lost without any utility, this method is not recommended. The second alternative which is feeding back of EAFFD into the production process of ferroalloys has operational challenges which need additional investment costs and high process control levels to be resolved. On the other hand, complete recycling of EAFFD, which is the last alternative, causes the design of an impractical process and additional costs when considering the physical, chemical and mineral properties of the dust. This situation has revealed the search for the utilization of the EAFFD in high value-added applications with a feasible process that will reduce the cost of disposal.

In the prior art, methods for the recycling of materials that can be reused from EAFFD can be divided into 2 groups: 1) processing the dust at a high temperature by pyrometallurgical method, 2) treating the dust by hydrometallurgical processes to recover precious metals/metal oxides.

Out of the two methods mentioned above, hydrometallurgical methods stand out with their theoretically low-cost equipment and low energy needs. However, at the end of the hydrometallurgical process, a high amount of environmentally "hazardous" waste is frequently obtained. In addition, EAFFD used in the production of scrap steel contains high amount of ferrous zinc ferrite ($ZnFe_2O_4$), most of which is largely insoluble even in aggressive environments. Therefore, another problem in hydrometallurgical processing of EAFFD is the necessity to create extremely aggressive process conditions for zinc recovery from zinc ferrite.

Considering the state-of-art, researches on using EAFD and/or obtaining metal oxide from EAFD while engineering them in different dimensions (nano-, micro-), morphologies (1D, 2D, 3D and/or mesopore structure) and structures (nanocrystalline, crystalline, amorphous) are seemed to be needed to exploit their uses in electrochemical applications such as battery technologies.

DETAILED DESCRIPTION OF THE INVENTION

The invention relates to the utilization of flue dust from the electric arc furnace that is used in the iron and steel industry for the production of ferro alloys or scrap metals, as electrode material in electrochemical applications. At this point, the composite to be obtained from flue dust or recovered metal oxide, metal hydroxide, metal ferrite, metal silicides and intermetallic structures may be used individually or together.

The purity level of the dusts obtained during recovery from the said EAFFD can be altered depending on the process parameters. In this case, it will be possible to obtain metal oxide, metal hydroxide, metal silicides, metal ferrite and intermetallic in amorphous/crystalline/nanocrystalline structure in pure or metal-doped nano/micro/mesopore 1D/2D/3D morphology. This approach will improve the performance of metal oxide electrodes in general terms.

Additional metal atoms to be found in oxide structures will be able to create solutions to the polarization problem that takes place in the conventional metal oxide electrodes since the additional metals work create electron-conducting paths in the oxide structure.

On the other hand, it is aimed to make morphological and compositional improvements in order to solve the problems such as the weak structural stability and low stability electrode/electrolyte interface displayed by the metal oxide electrodes. Thus, thanks to the shrinking particle size, the surface-volume ratio of the electrode increases, and structural stability is improved. Moreover, in case of using various metals' oxides as a mixture higher electrochemical performance (than that of the electrodes consisting of one-type of transition metal) will be possible thanks to the synergistic effect of various metals with each other. Thus, both the evaluation of the waste (EAFFD) with an environmentally friendly approach and the use of the waste as electrode material for energy technology, which is a high value-added application, will be achieved successfully.

DETAILED DESCRIPTION OF THE INVENTION

The present invention relates to the use of EAFFD and metal oxides, metal ferrites, metal silicides, metal hydroxides or intermetallics obtained from the Electric Arc Furnace (EAF) flue dust as electrode material in energy storage applications together or separately.

The expression "obtained from Electric arc furnace (EAF) flue dust" used in the scope of the invention refers to any processing of the EAFFD without involvement or application of existing procedures in the prior art to recover metal oxides, metal ferrites, metal silicides, metal hydroxides or intermetallics from EAFFD. Materials of 20 to 99.99% purity obtained by recovering metal oxides, metal ferrites, metal silicides, metal hydroxides or intermetallics contained therein are also included.

The term "energy storage applications" used within the scope of the invention refers to the systems that enable the energy produced at a certain time to be stored for later use. Capacitor, battery, e.g.; primary and non-rechargeable batteries such as alkaline batteries, zinc-carbon batteries, silver-oxide batteries, lithium batteries, secondary and rechargeable batteries such as aluminum ion batteries, vanadium redox batteries, zinc bromine batteries, lead/acid batteries, lithium sulfide batteries, lithium ion batteries, solid state lithium ion batteries ('solid-state'), lithium polymer batteries, magnesium ion batteries, metal-air batteries (eg lithium air cells, aluminum air cells, germanium air cells, calcium air cells, silicon air cells, zinc air cells, beryllium air cells, tin air cells, sodium air cells,), molten salt batteries, nickel/cadmium batteries, nickel metal hydride batteries, silver zinc batteries and nickel zinc batteries can be given as example.

In this regard, a preferred embodiment of the invention relates to the use of metal oxides, metal ferrites, metal silicides, metal hydroxides or intermetallics contained in the Electric Arc Furnace (EAF) flue dust, as electrode material in the production of capacitors or batteries together or separately.

Metal oxides ($Me_xO_y$) that can be found in the Electric Arc Furnace (EAF) flue dust can be selected from a group consisting of Me Si, Mo, V, Fe, Al, Mg, Zn, Cr, Co, Ni, Cu, Mn, Pb, Ti, Ca, Na , double, triple, quadruple combinations thereof or a mixtures thereof at any rate. Here, x and y are independent numbers.

The term metal in metal ferrites, metal silicides, metal hydroxides contained in Electric Arc Furnace (EAF) flue dust, can be selected from a group consisting of Fe, Al, Zn, Cr, Pb, Mn, Ti, Si, Mo, V, Co, Ni, Cu, Mg, Pb, Co, Na, double, triple, quadruple combinations thereof or a mixtures thereof at any rate.

Another aspect of the invention relates to use of electric arc furnace flue (EAFFG) dust as electrode material in energy storage applications, without any processing or by using it in conjunction with metal or with carbon sources such as graphite, graphene, fullerene or petroleum products, coke, glucose, fructose, sucrose or by covering the surfaces with another material.

The metal oxides, metal ferrites, metal silicides, metal hydroxides and/or intermetallics contained in the EAFFD of the invention can be in amorphous, crystalline or nanocrystalline structures.

Metal oxides, metal ferrites, metal silicides, metal hydroxides and/or intermetallics contained in the EAFFD of the invention can have a particle size between 1 nm and 1000 μm.

Metal oxides, metal ferrites, metal silicides, metal hydroxides and/or intermetallics in the EAFFD of the invention can be in 1-dimension, 2-dimensional or 3-dimensional morphology and/or mesoporous structure.

In a preferred application of the invention, the material obtained by mechanical grinding of EAFBG powder containing metal oxides, metal ferrites, metal sicytes, metal hydroxides and/or intermetalias can be used as electrode material in energy storage applications. In the grinding process, it is aimed to increase the surface area by disrupting the regular structure of the graphite layers ('exfoliation') while the dust size shrinks and its shape becomes homogenized. While the newly formed multiple 6 layers act as binding by preventing electrode fragmentation due to the volumeal transformation of metal oxide atoms, it also prevents degradation caused by combining metal oxides (agglomeration) during cycle testing.

In a preferred embodiment of the invention, the material obtained by mechanical grinding of EAFFD comprising metal oxides, metal ferrites, metal silicides, metal hydroxides and/or intermetallics can be used as electrode material in energy storage applications. In the grinding process, it is aimed to increase the surface area by reducing the size of the dust and homogenizing its shape while also peeling the graphite layers ("exfoliation") via disrupting its regular structure. The newly formed multiple layers act as a binder to prevent fragmentation of the electrode following the volumetric transformation of metal oxide atoms. They also prevent degradation caused by the agglomeration of particles during the cycle test.

The process prepared to recover materials from EAFFD can have single/multi-steps. Said steps may include a leaching step. The purity of the material to be obtained depending on the leaching parameters will vary between 20-99.99%. In this case, the obtained metal-doped oxide structures may exhibit higher conductivity compared to that of the pure oxides, hence the electrode performance can be improved. These structures can also be processed by any materials that contain carbon (carbon precursor). Carbon and any possible additional metal atoms to be present in the final product create electron pathways in the structure, leading improved reaction kinetics and mechanical buffering properties.

Methods available in the known state of the art can be used to recover metal oxides, metal ferrites, metal silicides, metal hydroxides and/or intermetallics from the EAFFD according to the invention.

An exemplary method suitable for use in the recovery of metal oxides, metal ferrites, metal silicides, metal hydroxides and/or intermetallics from EAFFD used in the production of steel from scrap comprises the steps of;

a. Washing the Electric Arc Furnace Flue Dust (EAFFD) with an aqueous solution containing chemical additive in 0.001-10 M concentration (leaching process),
  b. Separating the solid and liquid phases of the solution,
  c. Zinc oxide can be obtained by applying purification and calcination to the liquid phase,
  d. Mixing the solid phase obtained in step b) with an aqueous solution containing a chemical additive at a concentration of 0.001-10 M,
  e. Separating the solid and liquid phases of the solution obtained in step d),
  f. Zinc ferrite can be obtained by drying and calcining the solid phase obtained in step e),
  g. Chemical precipitation can be done by adding a reactive agent to the liquid phase obtained in step e),
  h. Separating the solid and liquid phases of the solution obtained in step g),
  i. Drying and calcining the solid phase obtained in step h),
  j. Obtaining metal doped oxide dusts after calcination in step i).

In an embodiment of the invention, the chemical additive used in step a) can be selected from a group consisting of ammonium carbonate, ferric chloride, sodium carbonate, ammonia, ammonium chloride, carboxylic acid, citric acid, royal water, oxalic acid, sodium hydroxide, sulfuric acid, hydrochloric acid, nitric acid, phosphoric acid, acetic acid, formic acid, potassium hydroxide or the double or triple combinations thereof In an embodiment of the invention, the washing process described in step a) can be carried out at a temperature of 0-100° C.

In an embodiment of the invention, the leaching process described in step a) can be carried out for a period of 1-24 hours.

In one embodiment of the invention, the calcination process carried out in step c) is carried out at a temperature between 200-1500° C. for a period of 1-24 hours.

In one embodiment of the invention, the purity of the zinc oxide obtained in step c) is between 20-99.99%.

In an embodiment of the invention, the separation of the liquid and solid phases in step b), e) and/or h) is carried out by filtration or centrifugation or by another method used to separate liquids and solids in the prior art.

In an embodiment of the invention, the chemical additive used in step d) is selected from a group consisting of ammonium carbonate, ferric chloride, sodium carbonate, ammonia, ammonium chloride, carboxylic acid, citric acid, royal water, oxalic acid, sodium hydroxide, sulfuric acid, hydrochloric acid, nitric acid, phosphoric acid, acetic acid, formic acid or potassium hydroxide or the double and triple combinations thereof In an embodiment of the present invention, mixing in step d) is carried out at a temperature between 0 and 100° C.

In an embodiment of the invention, mixing in step d) is carried out for a period of 1 to 40 hours.

In an embodiment of the invention, the drying process carried out in step f) is carried out at a temperature between 20-110° C. for a period of 8-24 hours.

In an embodiment of the invention, the calcination process carried out in step f) is carried out at a temperature between 200-1500° C. for a period of 1-24 hours.

In one embodiment of the invention, the reactive agent added to the liquid phase in step g) is to be selected from a group consisting of sodium hydroxide, iron sulfate, sodium metabisulphite, sodium hydrosulfite, ammonium hydroxide, ammonium chloride, hydrogen peroxide, potassium hydroxide the double or triple combinations thereof.

In an embodiment of the invention, chemical precipitation is carried out in step g) by adding a reactive agent to the liquid phase at a temperature of 0-90° C.

In an embodiment of the invention, the drying process carried out in step i) is carried out at a temperature between 20-110° C. for a period of 8-24 hours.

In an embodiment of the invention, the calcination process carried out in step i) is carried out at a temperature of 200-1500° C. for a period of 1-24 hours.

The sample details of the EAFFD detailed above can be applied by changing the steps of the proposed process for the recovery of metal oxide, zinc ferrite, etc. by replacing the steps or repeating the steps in various rows.

In the context of this specification, the term "comprises" is intended to indicate "includes".

Where technically appropriate, embodiments of the invention can be combined.

Applications are described here with specific features/elements. The specification also includes other applications that include or consist essentially of said features/elements.

The applications specifically and clearly described herein may constitute the basis for a disclaimer, alone or in combination with one or more other applications.

The invention will now be described only by examples given to illustrate the invention and which should not be construed as constraints in any way.

EXAMPLE 1: METHOD USED FOR THE RECOVERY OF METAL OXIDES, METAL FERRITES, METAL SILICIDES, METAL HYDROXIDES AND/OR INTERMETALLIC FROM ELECTRIC ARC FURNACE FLUE DUST

The production process basically begins with washing the dust in an aqueous solution. Said solution may contain chemical reagents dissolved in water in the concentration range of 0.001-10 M. It can be preferred as a reactive agent, consisting of ammonium carbonate, ferric chloride, sodium carbonate, ammonia, ammonium chloride, carboxylic acid, citric acid, royal water, oxalic acid, sodium hydroxide, sulfuric acid, hydrochloric acid, nitric acid, phosphoric acid, acetic acid, formic acid, potassium hydroxide, or the double and triple combinations thereof. The temperature of this leaching process can be between 0-100° C. and its duration can vary between 1 h and 24 h. After leaching, solid/liquid is separated, liquid solution is purified, and zinc oxide can be obtained by calcining. The temperature for calcination can be between 200-1500° C. and its duration can vary between 1 h and 24 h. The purity of the oxide obtained can be between 20-99.99%. The solid part remaining from the leaching process is treated with a reagent having a concentration in the range of 0.001-10M. During this process, reagents consisting of ammonium carbonate, ferric chloride, sodium carbonate, ammonia, ammonium chloride, carboxylic acid, citric acid, royal water, oxalic acid, sodium hydroxide, sulfuric acid, hydrochloric acid, nitric acid, phosphoric acid, acetic acid, formic acid, potassium hydroxide, or the double and triple combinations thereof can be used. The processing temperature can be between 0-100° C., its duration can vary from 1 h to 40 h. After the chemical reaction of the additive, the filtered residue is dried at a temperature between 20-110° C., between 8 h-24 h, and zinc ferrite can be obtained by calcining. The temperature for calcination can be between 200-1500° C. and its duration can vary between 1 h and 24 h. The remaining liquid part is subjected to chemical precipitation with a reactive agent. Here, sodium hydroxide, ammonium hydroxide, iron sulfate, sodium metabisulphite, sodium hydrosulfite, ammonium chloride, hydrogen peroxide, sodium hydroxide, potassium hydroxide can be used. Precipitation is carried at a temperature between 0-90° C. Then, the precipitate is removed and dried at a temperature between 20-110° C., 8 h-24 h and calcined metal oxide can be obtained. The temperature for calcination can be between 200-1500° C. and its duration can vary from 1 h to 24 h.

EXAMPLE 2: ELECTRODE PREPARATION METHOD FOR LIB THROUGH ELECTRIC ARC FURNACE FLUE DUST (EAFFD) Collected During The Steel Production From Scrap Materials The EAFFD obtained as a result of the production of scrap steel is subjected to mechanical alloying for 44 hours with activated carbon (in the steel chamber with 6 mm steel balls) and the composite dust is utilized as an anode. (FIG. 5).

If metal ferrite (zinc ferrite) materials obtained from the electrical arc furnace that produces steel from scrap materials are used as electrodes, its first discharge capacity against Li is higher than that of the graphite electrode (FIG. 6).

EXAMPLE 3: METHOD OF PREPARING ELECTRODES FROM FLUE DUST (EAFFD) OF ELECTRIC ARC FURNACE THAT IS USED IN FERROALLOY (FeSi) Production

| Example No | Sample Code | Definition of the process applied |
|---|---|---|
| Example 3.1 | EAFFGT-leaching with water | During the production of ferroalloy (i.e. FeSi), the flue dust collected from the electric arc furnace is washed with water at a temperature 60° C. for 2 hours, then dried at 70° C. for 12 hours in air. |
| Example 3.2 | EAFFGT-leaching with acid | During the production of ferroalloy (i.e. FeSi), the flue dust collected from the electric arc furnace is washed with water at a temperature 60° C. for 2 hours, then leached in 3M HCl solution at 90° C. for 18 hours (with 1000 rpm stirring rate), and dried at 70° C. for 12 hours in air. |
| Example 3.3 | EAFFGT-sucrose | 1 g of sucrose-is mixed with 100 ml ethanol, then the flue dust collected from the electric arc furnace that produces ferroalloy (i.e. FeSi) is added in 10 ml volume and mix; the slurry is treated at 600° C. for 3 h under nitrogen atmosphere. |
| Example 3.4 | EAFFGT-glucose | Glucose is mixed with water, then the flue dust collected from the electric arc furnace that produces ferroalloy (i.e. FeSi) is added. The mixture is transferred in a steel autoclave (of 200 ml) for hydrothermal treatment at 180° C. for 3 h |

The materials obtained as a result of the processes given in the examples were tested as an anode material in different voltage ranges against Li and the results revealed that the said materials were active against Li (FIG. 1-6).

Figure 1:
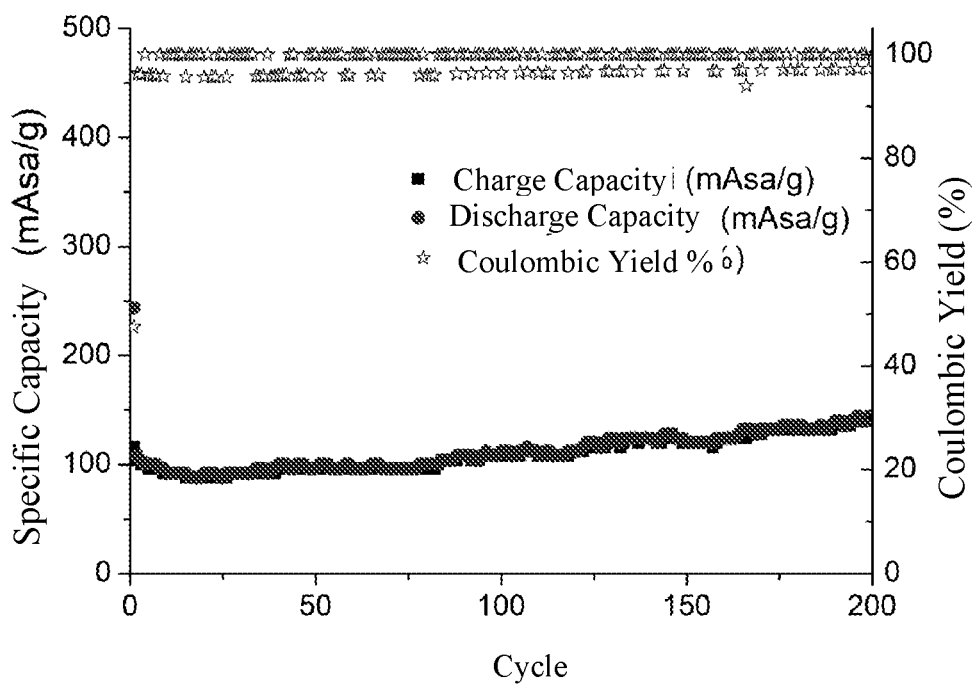
FIG. 1: During the production of ferroalloy (i.e. FeSi), the flue dust collected from the electric arc furnace is washed with water (Example 3-1) (50 mV-3V vs Li, 50 mA/g load)
Figure 2:
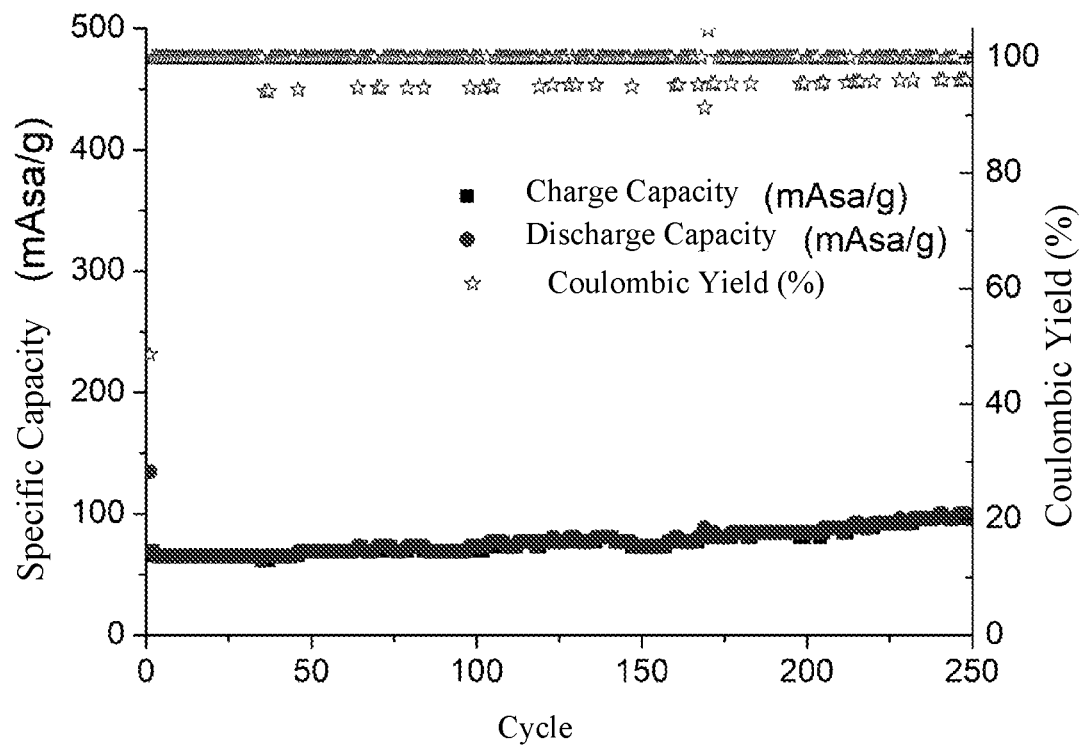
FIG. 2: During the production of ferroalloy (i.e. FeSi), the flue dust collected from the electric arc furnace is washed with water, then HCl solution (Example 3-2) (1 mV-3V vs Li, 50 mA/g load)
Figure 3:
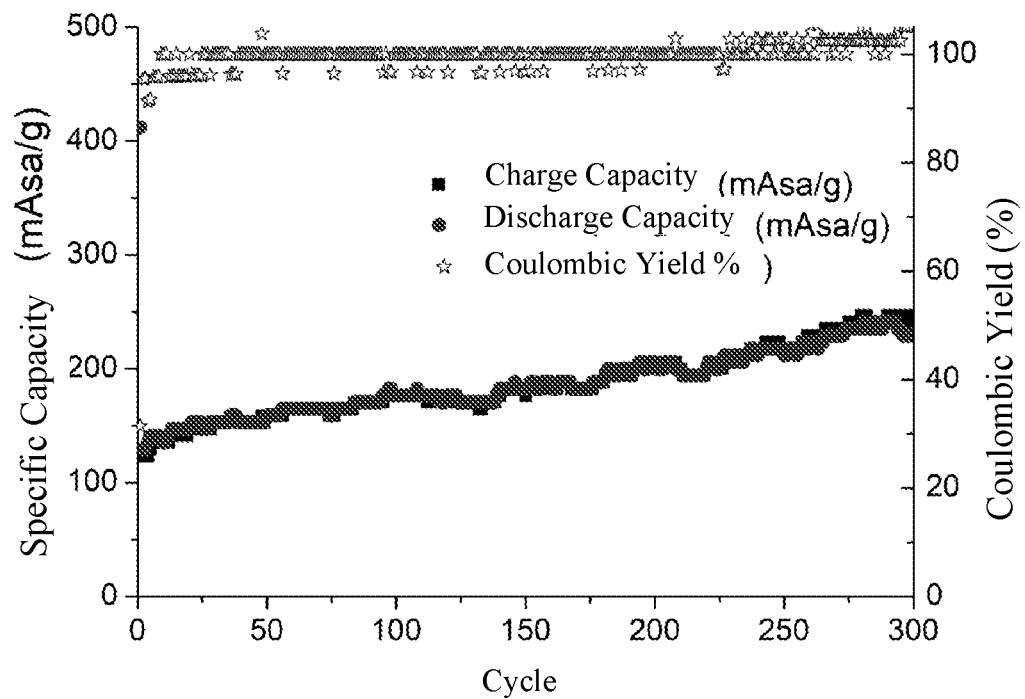
FIG. 3: During the production of ferroalloy (i.e. FeSi), the flue dust collected from the electric arc furnace is washed with water, then mixed with sucrose and heat treated (Example 3-3) (50 mV-3V vs Li, 50 mA/g load)
Figure 4:
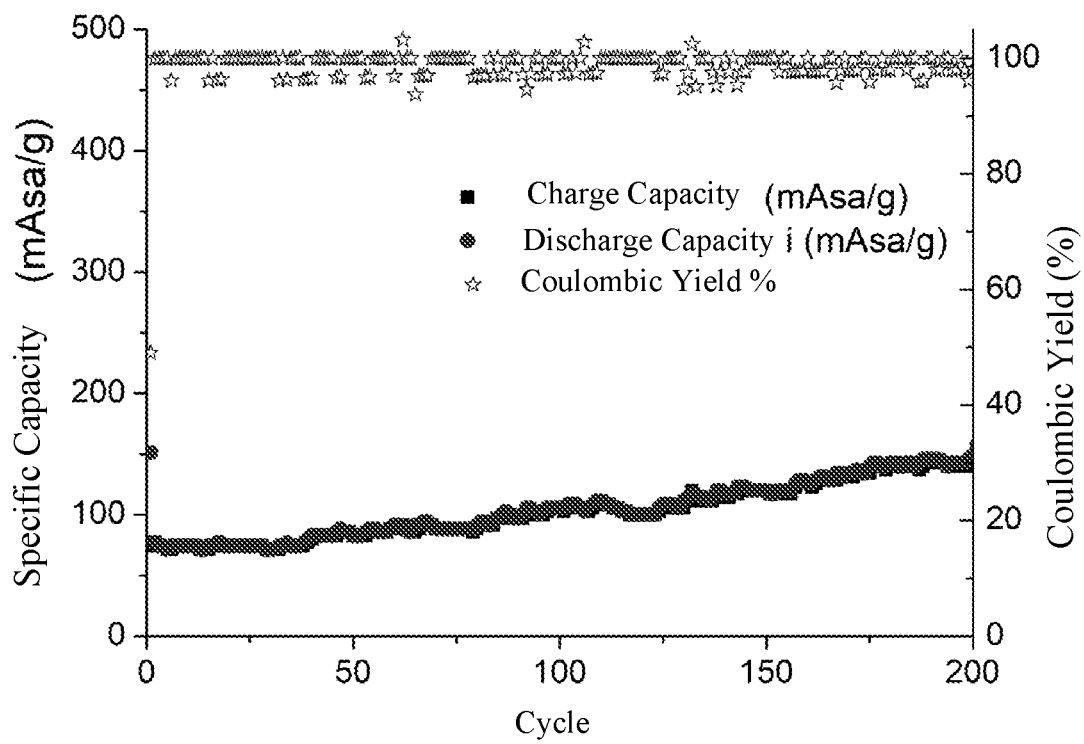
FIG. 4: During the production of ferroalloy (i.e. FeSi), the flue dust collected from the electric arc furnace is washed with water, then mixed with glucose and hydrothermally treated (Example 3-4) (1 mV-3V vs Li, 50 mA/g load)
Figure 5:
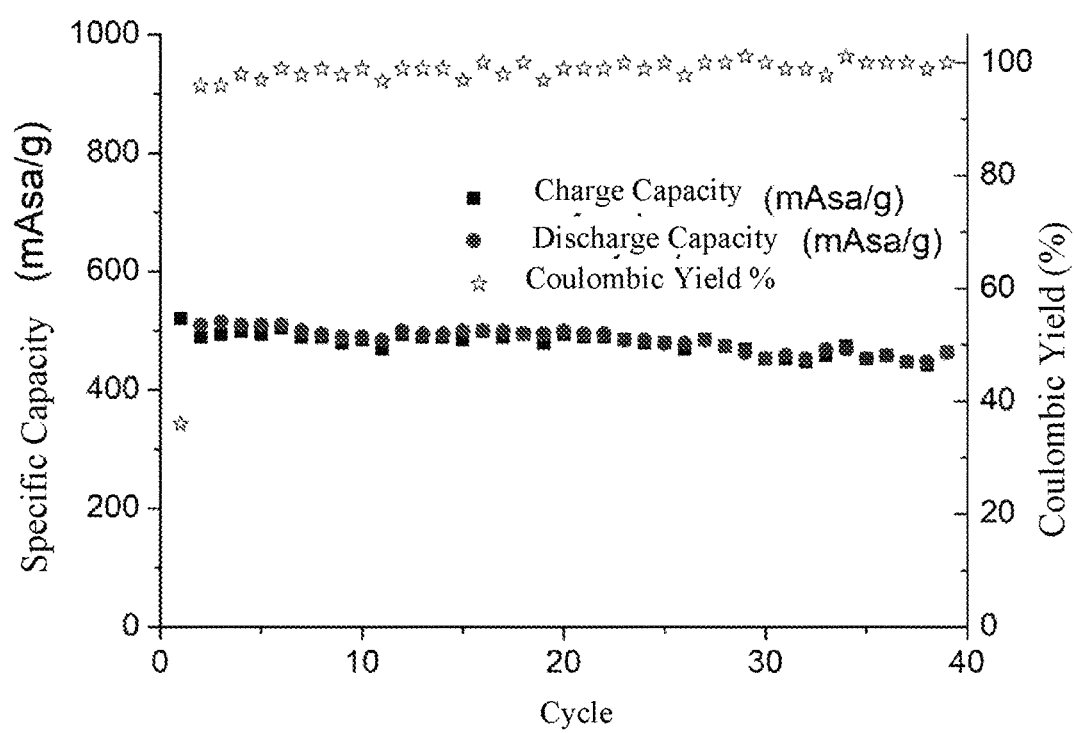
FIG. 5: During the production of steel from scrap materials, the flue dust collected from the electric arc furnace is mechanically (high energy ball milling) milled with active C for 44 h (1 mV-3V vs Li, 50 mA/g load)
Figure 6:
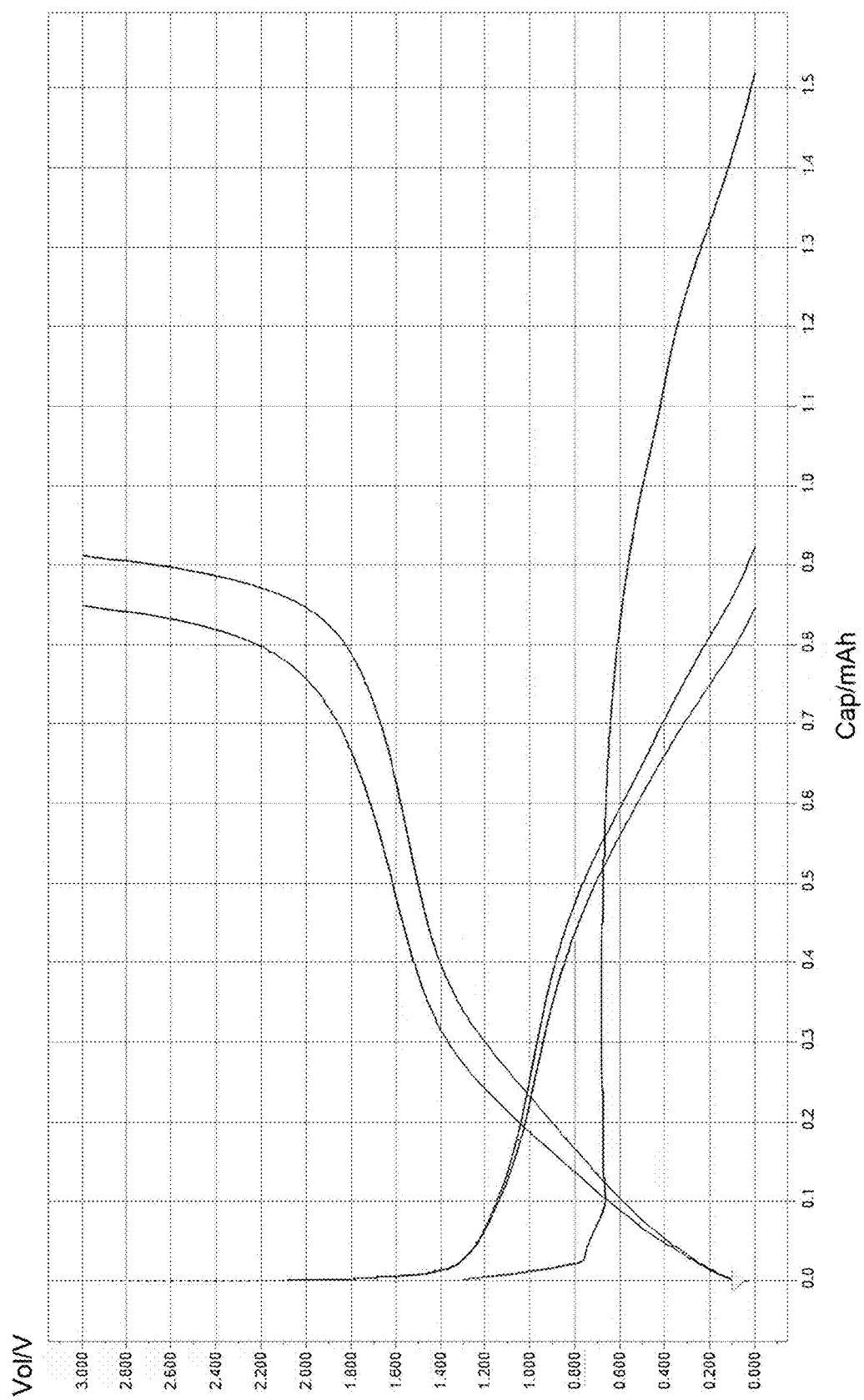
FIG. 6: Voltage-capacity curve of $ZnFe_2O_4$ powders that are recovered from the electric arc furnace flue dust collected during steel production from scrap material. (1 mV-3V vs Li, 50 mA/g load).

The invention claimed is:

1. A method of forming an electrode material for use in a battery, the method comprising:

calcining electric arc furnace flue dust so as to recover a metal oxide therefrom, the calcining being at a temperature of 200° C. to 1500° C. for a period of one hour to twenty-four hours, the metal oxide having a purity of between 20% to 99.99%; and forming the electrode material for use in the battery from the calcined electric arc furnace flue dust without applying any mechanical treatment.

2. The method of claim 1, wherein the battery is selected from the group consisting of an alkaline battery, a zinc-carbon battery, a silver-oxide batter and a lithium battery.

3. The method of claim 1, wherein the metal oxide is selected from the group consisting of an oxide of Is, Mo, V, Fe, Al, Mg, Zn, Cr, Co, Ni, Cu, Mn, Pb, Ti, Ca, Na or a combination thereof.

4. The method of claim 1, wherein the metal oxide is amorphous.

5. The method of claim 1, wherein the metal oxide is crystalline.

6. The method of claim 1, wherein the metal oxide is nanocrystalline.

7. The method of claim 1, wherein the metal oxide has a particle size of between 1 nm and 1000 nm.

* * * * *